(12) United States Patent
Qi et al.

(10) Patent No.: US 11,587,739 B2
(45) Date of Patent: Feb. 21, 2023

(54) CHIP-STYLE CONDUCTIVE POLYMER CAPACITOR

(71) Applicant: Dongguan Sunlord Electronics Co., Ltd., Dongguan (CN)

(72) Inventors: Zhaoxiong Qi, Dongguan (CN); Youyun Li, Dongguan (CN); Taibiao Zeng, Dongguan (CN); Fan Yang, Dongguan (CN)

(73) Assignee: Dongguan Sunlord Electronics Co., Ltd., Dongguan (CN)

( * ) Notice: Subject to any disclaimer, the term of this patent is extended or adjusted under 35 U.S.C. 154(b) by 0 days.

(21) Appl. No.: 17/560,311

(22) Filed: Dec. 23, 2021

(65) Prior Publication Data
US 2022/0367119 A1    Nov. 17, 2022

(30) Foreign Application Priority Data
May 11, 2021   (CN) .......................... 202110511973.1

(51) Int. Cl.
| | | |
|---|---|---|
| *H01G 9/012* | (2006.01) | |
| *H01G 9/15* | (2006.01) | |
| *H01G 9/08* | (2006.01) | |
| H01G 9/04 | (2006.01) | |
| H01G 9/048 | (2006.01) | |

(52) U.S. Cl.
CPC ............... *H01G 9/012* (2013.01); *H01G 9/08* (2013.01); *H01G 9/15* (2013.01); H01G 9/048 (2013.01); H01G 2009/05 (2013.01)

(58) Field of Classification Search
CPC ..................................................... H01G 9/012
See application file for complete search history.

(56) References Cited

U.S. PATENT DOCUMENTS

| | | | |
|---|---|---|---|
| 2008/0247122 A1* | 10/2008 | Vaisman | .................. H01G 9/15 29/25.03 |
| 2009/0201631 A1 | 8/2009 | Kasuga | |

(Continued)

FOREIGN PATENT DOCUMENTS

| | | |
|---|---|---|
| CN | 1275783 A | 12/2000 |
| CN | 1198301 | 4/2005 |

(Continued)

*Primary Examiner* — Eric W Thomas
(74) *Attorney, Agent, or Firm* — Winston Hsu

(57) ABSTRACT

A chip-style conductive polymer capacitor and a method for packaging the same, wherein the capacitor includes a chip-style conductive polymer capacitor element, a substrate, and a packaging material layer; the chip-style conductive polymer capacitor element is provided on the substrate and includes an anode tantalum core, an anode terminal, an anode base electrode, a dielectric layer, a cathode layer, and a cathode base electrode; the anode tantalum core and the cathode layer are separated by the dielectric layer; the anode terminal is made of a tantalum metal chip or a tantalum-niobium alloy chip, and has a rectangle or rounded rectangle cross section. The packaging method herein enables a vacuum injection molding packaging structure or a spray coating packaging structure covering a full range of a packaging thickness from 0.3 to 10 mm, realizes arrayed packaging with high efficiency, and ensures the electrical performance and reliability of the product.

4 Claims, 8 Drawing Sheets

(56) References Cited

U.S. PATENT DOCUMENTS

| | | | |
|---|---|---|---|
| 2009/0308532 A1 | 12/2009 | Kinoshita | |
| 2012/0206858 A1* | 8/2012 | Ibata | H01G 9/15 |
| | | | 361/528 |
| 2012/0262847 A1 | 10/2012 | Kawai | |
| 2015/0194267 A1* | 7/2015 | Fujii | H01G 9/012 |
| | | | 361/528 |
| 2015/0194269 A1* | 7/2015 | Fujii | B32B 37/04 |
| | | | 361/528 |
| 2022/0013302 A1* | 1/2022 | Kim | H01G 9/048 |
| 2022/0093327 A1* | 3/2022 | Hong | H01G 9/15 |

FOREIGN PATENT DOCUMENTS

| | | | |
|---|---|---|---|
| CN | 101162654 A | | 4/2008 |
| CN | 203367022 U | | 12/2013 |
| CN | 111133541 A | | 5/2020 |
| CN | 112185707 A | | 1/2021 |
| CN | 112735828 A | | 4/2021 |
| JP | 2004281716 A | * | 10/2004 |
| JP | 2008-277331 A | | 11/2008 |
| TW | 200943342 A1 | | 10/2009 |

\* cited by examiner

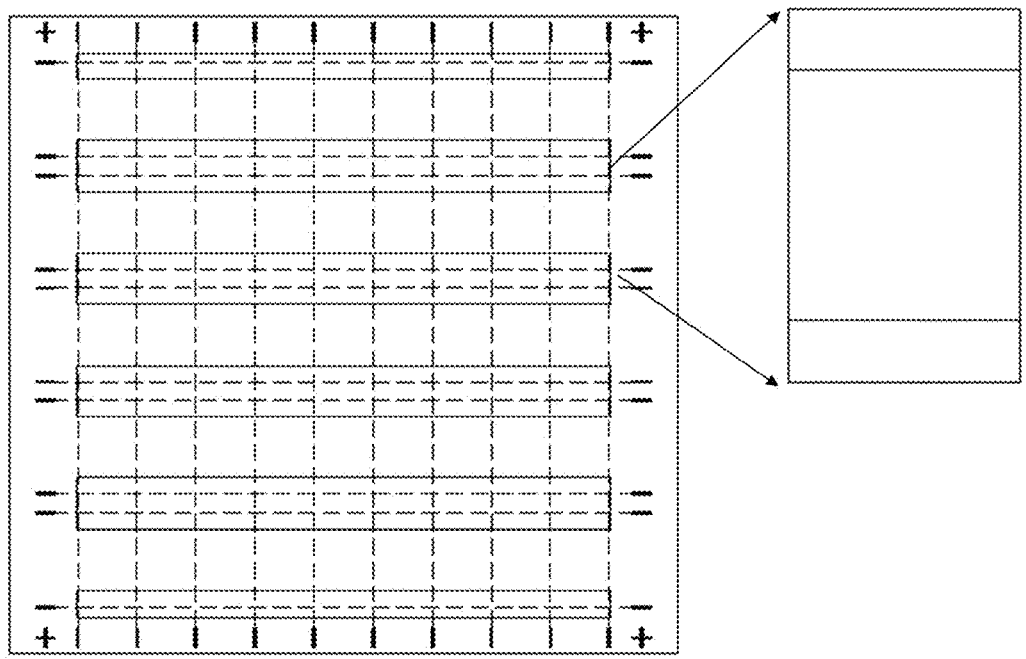
FIG.5
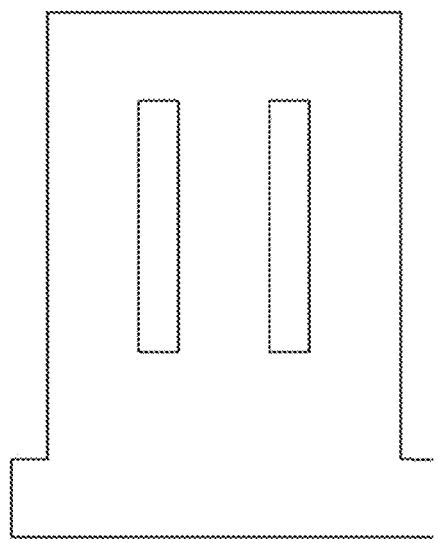 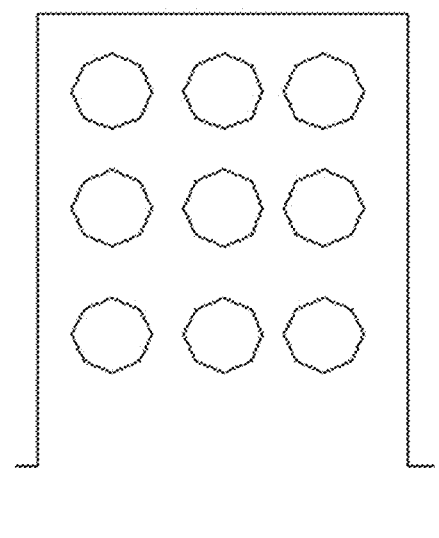
FIG.6A        FIG.6B

CHIP-STYLE CONDUCTIVE POLYMER CAPACITOR

BACKGROUND OF THE INVENTION

1. Field of the Invention

The present invention relates to the field of chip-style conductive polymer capacitors, more particularly, to a chip-style conductive polymer capacitor and a method for packaging the same.

2. Description of the Prior Art

For a conventional chip electrolytic capacitor, a product is assembled on a lead frame, a cathode of a capacitor element is bonded to a cathode lead frame through a conductive silver paste to lead out a cathode of the product; an anode is led out through resistance welding; the capacitor is then formed through epoxy injection packaging. This approach requires that a length of tantalum wire be reserved for welding to the anode lead frame to ensure that a weld area is sufficiently spaced from a core shoulder to prevent the weld area from shorting to the core, thus limiting the height of the product in design. In addition, the design of a demolding angle of a plastic packaging film also limits the height of the product in design. Furthermore, a resin material thickness on one of the six package sides of the capacitor is at least 0.3 mm, which takes a large percent of the volume of the product itself (the anode core block) and results in low spatial efficiency, further limiting the set values of the product in length, width, and thickness. Therefore, in the packaging structure design for a conventional chip-style solid capacitor, the volume of the product can only reach 20-50% of a standard (EIA standard size) volume, resulting in limited powder load in limited space, which is not conducive to product miniaturization and thinning.

Chinese patent publication No. CN1198301C discloses a bottom-mounted chip-style solid capacitor. As shown in FIG. 1, a cathode is led out by mounting a tantalum capacitor element mounted on a substrate, and an anode is led out as a tantalum wire or a metal chip, and the tantalum wire and the metal chip are bonded via a nickel, palladium, and gold paste. The volume of the product of this structure can reach 50-70% of the standard (EIA standard size) volume, still limited in powder load in limited space, far from optimal spatial efficiency.

Moreover, even the capacitor products with the above-mentioned undesirable spatial efficiency still have great risks in product reliability and robustness, not to mention the case of an arrayed packaging method that features high efficiency; therefore, an improvement is desirable.

The above background is merely intended to facilitate understanding the inventive concept and technical solution of the present application and does not necessarily belong to the prior art of the present application. Insofar as there is no clear evidence indicating that the above has been disclosed before the filing date of the present application, the above background should not be used to evaluate the novelty and inventive step of the present application.

SUMMARY OF THE INVENTION

To overcome the above deficiencies of the prior art in terms of spatial efficiency, reliability and robustness, the present invention provides a chip-style conductive polymer capacitor, including a chip-style conductive polymer capacitor element, a substrate, and a packaging material layer; the chip-style conductive polymer capacitor element is provided on the substrate and includes an anode tantalum core, an anode terminal, an anode base electrode, a dielectric layer, a cathode layer, and a cathode base electrode; the anode tantalum core and the cathode layer are separated by the dielectric layer; the anode base electrode includes two parts on the front and back sides, respectively, of one end of the substrate, connected through an electroplating layer and/or a via-hole; the cathode base electrode includes two parts on the front and back sides, respectively, of the other end of the substrate, connected through an electroplating layer and/or a via-hole; a cross section of the anode terminal is a rectangle or a rounded rectangle, and the anode terminal is connected to the anode base electrode on a front side of the substrate through bonding, welding or electroplating and led out as an anode; the cathode layer is connected to the cathode base electrode on the front side of the substrate, the cathode base electrode on the front side of the substrate is connected to the substrate through a conductive silver paste layer, and the cathode base electrode on the back side of the substrate is led out as a cathode.

Alternatively, or preferably, the capacitor of the invention may also adopt the following solution.

An anode end electrode and a cathode end electrode are formed with an electroplating layer, wherein a longitudinal section of the anode end electrode is L-shaped, with vertical and lateral portions located at one end surface of the capacitor and one end of a bottom surface adjacent to the end surface; a longitudinal section of the cathode end electrode is L-shaped, with vertical and lateral portions located at the other end surface of the capacitor and one end of the bottom surface adjacent to the end surface; the anode end electrode is connected to both the anode terminal and the anode base electrode, and the cathode end electrode is connected to both the cathode base electrode and the cathode layer.

The anode base electrodes arranged on the front and back sides of the substrate are connected through a via-hole, and the cathode base electrodes arranged on the front and back sides of the substrate are connected through a via-hole.

A notch structure is provided in the substrate corresponding to a position where the chip-style conductive polymer capacitor element is provided.

The notch structure has a depth of 5 to 100 μm.

A dimension at an opening is smaller than a dimension at a bottom of the notch structure.

A length of the anode terminal is 10 to 100 μm, and a total thickness of the substrate is 5 to 1000 μm.

a longitudinal section of the electroplating layer is L-shaped, with a vertical portion and a lateral portion of the L-shape respectively located on one end surface and a bottom surface adjacent to the end surface of the capacitor; a longitudinal section of the cathode end electrode is L-shaped, with a vertical portion and a lateral portion of the L-shape respectively located on the other end surface and a bottom surface adjacent to the end surface of the capacitor.

The present invention also provides a method for packaging the chip-style conductive polymer capacitor, including the steps of: substrate pretreatment: providing a first cut surface mark and a second cut surface mark on the substrate; arranging a plurality of the capacitor elements in an array on the substrate, wherein the capacitor element includes an anode tantalum core, an anode terminal, an anode base electrode, a dielectric layer, a cathode layer, and a cathode base electrode, and the anode tantalum core and the cathode layer are separated by the dielectric layer; the anode base electrode includes two parts on the front and back sides, respectively, of one end of the substrate, connected through an electroplating layer or a via-hole; the cathode base electrode includes two parts on the front and back sides, respectively, of the other end of the substrate, connected through an electroplating layer or a via-hole; a cross section of the anode terminal is a rectangle or a rounded rectangle;

packaging of arrayed modules: packaging in either a vacuum packaging or a spray coating packaging manner;

end surface cutting: cutting along the first cut surface mark and the second cut surface mark, respectively, to form an anode cut end surface and a cathode cut end surface, wherein the anode cutting end surface is a rectangle or a rounded rectangle;

electrode treatment: connecting the anode terminal to the anode base electrode on a front side of the substrate through bonding, welding or electroplating and leading the same out as an anode; connecting the cathode layer to the cathode base electrode on the front side of the substrate, and connecting the cathode base electrode on the front side of the substrate to the substrate through a conductive silver paste layer; and dissection cutting: cutting to obtain the chip-style conductive polymer capacitor of individual particles.

Alternatively, or preferably, the method for packaging herein may also adopt the following solution.

In the step of electrode treatment, plasma cleaning and metal deposition are also performed before bonding, welding or electroplating the anode cut surface, or plasma cleaning and vacuum coating are also performed before bonding, welding or electroplating, or plasma cleaning and vacuum sputter to deposit metal are also performed before bonding, welding or electroplating.

The substrate is a metal substrate, an alloy substrate, a chip ceramic substrate, a chip glass fiber substrate, or a thin film substrate; when the substrate is the chip ceramic substrate, the chip glass fiber substrate, or the thin film substrate, the substrate has a printed circuit embedded in a metal or alloy as the base electrode; when the substrate is the metal substrate, the metal substrate is made of tantalum, niobium, copper, silver, nickel, tin, palladium, gold, ruthenium, or aluminum; when the substrate is the alloy substrate, the alloy substrate is made of at least one of a tantalum-niobium alloy, a nickel-iron alloy, a nickel-iron-copper alloy, and a copper alloy.

The substrate is a sheet of plastic steel, teflon, polyvinyl chloride, polycarbonate, or polyurethane, and the substrate has a printed circuit embedded in a metal or alloy as the base electrode.

The present invention is advantageous in that:

in addition to the miniaturization or thinning of the product, it is also possible to enable arrayed packaging with high efficiency and to ensure the electrical performance and reliability of the product. The method for packaging of the present invention enables a vacuum injection molding packaging structure or a spray coating packaging structure covering a packaging thickness from 0.3 mm to 10 mm, applies to all products having chip-structured elements, such as a solid capacitor element, a chip inductance element, a chip magnetic core element, a chip ceramic element, a chip glass fiber element, or a chip film element and a substrate, which features wide applicability as a platform structure shared by multiple products.

Moreover, the present invention can effectively increase the bonding area and the bonding strength of the conductive silver paste by providing a plurality of notch structures for enhancing the bonding on the front side of the substrate, so that the miniaturization/thinning of the product and the reliability can be enabled, too, with significant performance.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a schematic structural diagram showing a back side of the substrate according to the embodiment of FIG. 4.

FIGS. 6A, 6B, 6C, and 6D are examples of bond-enhancing notch structures on the front side of the substrate according to the embodiment of FIG. 4, implemented either independently or in combination.

DETAILED DESCRIPTION

Figure 1:
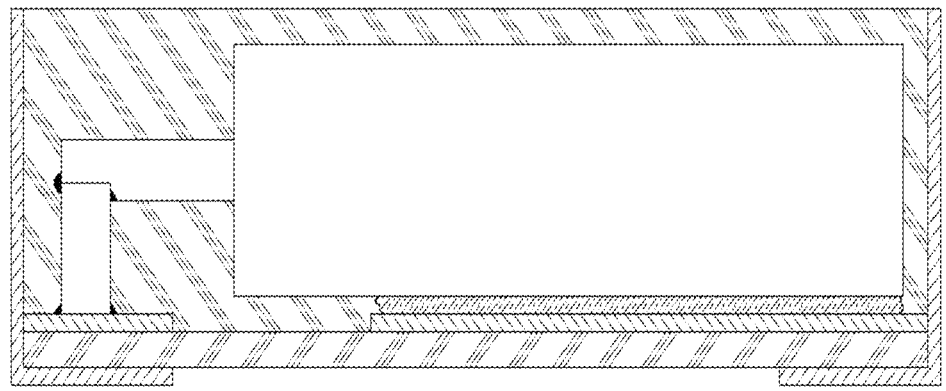
FIG. 1 is a sectional view showing a structure of a chip-style conductive polymer capacitor of the prior art.

The present invention is described in further detail below with reference to particular examples and FIGS. 1 to 13, where like reference numerals refer to like parts, unless specifically stated otherwise. It should be emphasized that the following description is merely exemplary in nature and is not intended to limit the scope of the invention or its application.

Terms/Definitions

A via-hole is also known as a metalized hole. In double-sided and multi-layer boards, in order to connect the printed wires between the layers, a common hole, i.e., a via-hole, is drilled at the intersection of the wires where the layers need to be connected.

The inventor(s) of the present application found that there is a contradiction and great risk in terms of product reliability during miniaturization and/or thinning of capacitor products because if there is no proper cooperation between the structure of the capacitor element and the packaging method, it is necessary, whether through welding or bonding the anode, to reserve necessary space for operation and avoiding short circuit of welding, and given the requirement for the greatest miniaturization, the components of the product with an original thickness of less than 0.3 mm are even thinned, usually in an order of μm, which inevitably results in poor reliability of the welding or bonding, and thus affects the electrical performance and robustness of the product. In addition, the product configurations in the prior art present a risk of an open circuit at end electrodes, particularly at anode ends that require welding or bonding, and this has become a major reason for reduced product reliability and service life.

Example 1

Figure 2:
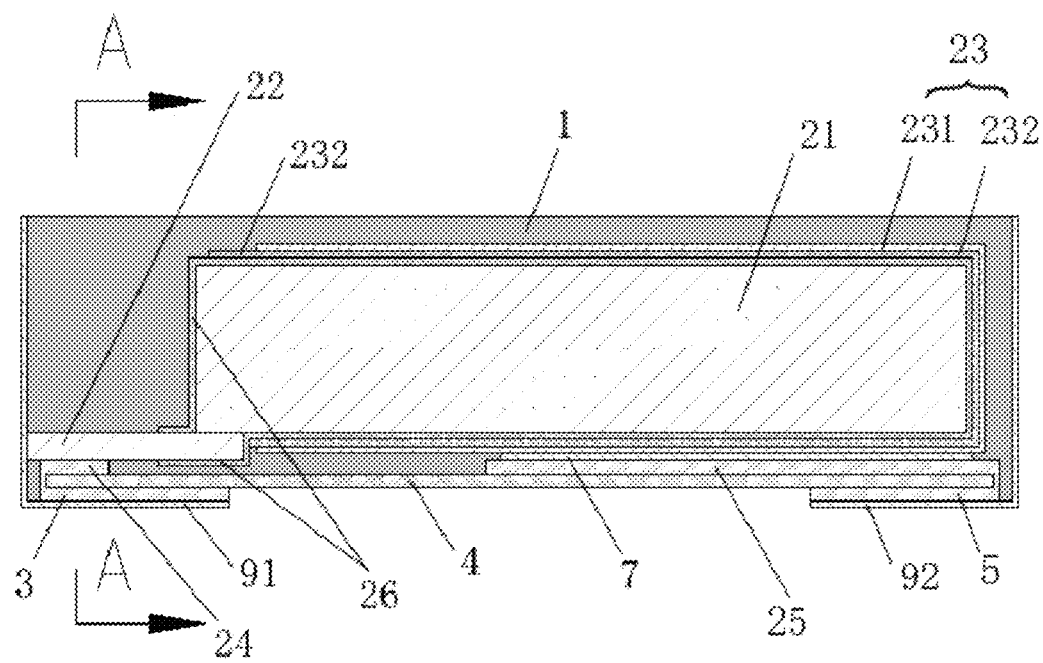
FIG. 2 is a sectional view showing a structure of a chip-style conductive polymer capacitor according to an embodiment of the present invention.
Figure 3:
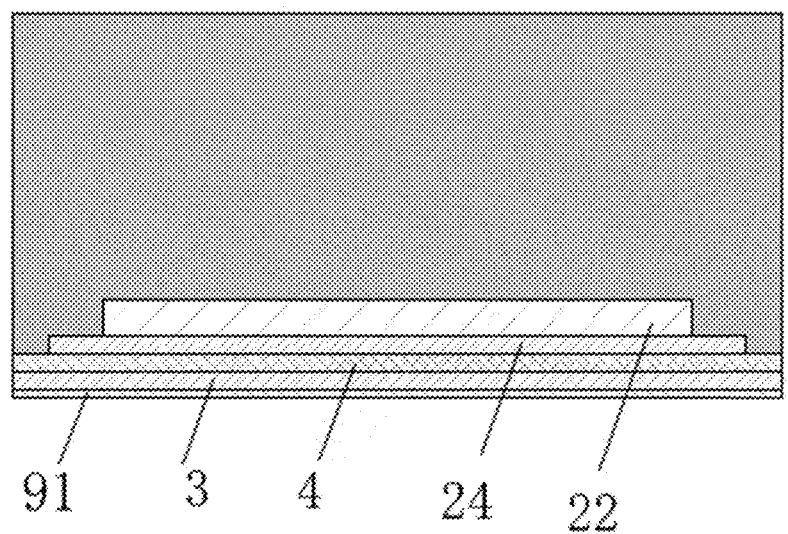
FIG. 3 is a sectional view taken along line A-A of FIG. 2.

As shown in FIGS. 2 and 3, a front view and a side view along line A-A of the schematic cross-sectional structure of the chip-style conductive polymer capacitor packaged by the packaging material layer 1, the capacitor includes a chip-style conductive polymer capacitor element, a substrate 4 and an insulating layer thereof, i.e., a dielectric layer 26, an anode end electrode 3 and an anode base electrode 24 connected thereto, and a cathode end electrode 5 and a cathode base electrode 25 connected thereto.

An end electrode (an anode end electrode 3 and/or a cathode end electrode 5) and an inner electrode (an anode base electrode 24 and/or a cathode base electrode 25) of the capacitor are connected through a via-hole, and the capacitor element in the capacitor includes an anode tantalum core 21 and an anode terminal 22 thereof, a cathode layer 23, and a cathode base electrode 25, wherein the anode tantalum core 21 and the cathode layer 23 are separated by the dielectric layer 26. The cathode layer 23 includes a polymer layer plus graphite layer 231 and a silver paste layer 232. The anode terminal 22 is made of a tantalum metal sheet or a tantalum-niobium alloy sheet, in a flat shape, and preferably has a rectangular or rounded rectangular cross section; the length a of the anode terminal 22 is 10 to 100 μm; and a length direction of a cut surface is along a width direction of the capacitor.

Compared with the tantalum wire with a circular cross section in the prior art, the cut surface of the anode terminal 22 after cutting has a rectangular or rounded rectangular flat shape, as shown in FIGS. 2 and 3, the anode terminal 22 greatly increases a contact area with the anode base electrode 24, and solves the risk of an open circuit at an end electrode (the anode terminal 22 is disconnected from the anode base electrode 24 during processing or use), so that the product can be further miniaturized and/or thinned without affecting the reliability and service life of the product.

The capacitor element is provided on an insulating layer of the substrate 4 serving as a conductive carrier, the substrate 4 may have a total thickness of 5 to 1000 μm, preferably 10 to 500 μm, even more preferably, a total thickness of 50 to 100 μm.

The anode base electrode 24 include two parts on the front and back sides, respectively, of one end of the substrate 4, connected through an electroplating layer and/or a via-hole; the cathode base electrode 25 includes two parts on the front and back sides, respectively, of the other end of the substrate 4, connected through an electroplating layer and/or a via-hole. The anode end electrode 3 and the cathode end electrode 5 of the capacitor are respectively provided at both ends of the bottom of the capacitor, a cross section of the anode terminal 22 is a rectangle or a rounded rectangle, and the anode terminal 24 is connected to the anode base electrode 24 on a front side of the substrate 4 through bonding, welding or electroplating and led out as an anode. The cathode layer 23 is connected to the cathode base electrode 25 on the front side of the substrate 4, the cathode base electrode 25 on the front side of the substrate 4 is connected to the substrate 4 through the conductive silver paste layer 7, and the cathode base electrode 25 on the back side of the substrate 4 is led out as a cathode.

Preferably, the anode terminal 22 is led out from the bottom of the anode tantalum core 21, and after being led out, the lower bottom surface of the anode terminal 22 is at the same height as the upper surface of the anode base electrode 24 on the front side of the substrate 4, and this structure can facilitate a reliable connection through bonding, welding or electroplating between the anode terminal 22 and the cathode base electrode 25.

In this embodiment, one side of the cathode base electrode 25 is connected to the cathode layer 23 through the conductive silver paste layer 7, and the other side is connected to the cathode end electrode 5. The insulating layer is an FR4 or PP film layer covering the upper surface of the substrate 4, and serves to separate the anode base electrode 24 and the cathode base electrode 25 and prevent the same from conducting.

In FIG. 2, a first end electrode electroplating layer 91 is plated on the anode cut surface, and the first end electrode electroplating layer 91 is connected to both the anode terminal 22 and the anode end electrode 3 of the capacitor. A second end electrode electroplating layer 92 is plated on the cathode cut surface, and the second end electrode electroplating layer 92 is connected to both the cathode base electrode 25 and the cathode end electrode 5.

By pre-embedding metal therein, the via-hole can conduct the upper and lower electrodes of the substrate internally, so that the electrical performance of the product will not be affected with or without the end electrode electroplated, in other words, the end electrode electroplating process can be omitted. In addition, the via-hole may be filled with some resin to enhance the bonding strength.

In this embodiment, the length of the substrate 4 is equal to or less than the total length of the chip-style conductive polymer capacitor element, and the substrate 4 can take the form of a metal substrate, an alloy substrate, a chip ceramic substrate, a chip glass fiber substrate, or a thin film substrate; when the substrate is the chip ceramic substrate, the chip glass fiber substrate, or the thin film substrate, the substrate has a printed circuit embedded in a metal or alloy as the base electrode; when the substrate is the metal substrate, the metal substrate is made of tantalum, niobium, copper, silver, nickel, tin, palladium, gold, ruthenium, or aluminum; when the substrate is the alloy substrate, the alloy substrate is made of at least one of a tantalum-niobium alloy, a nickel-iron alloy, a nickel-iron-copper alloy, and a copper alloy.

In addition, the substrate 4 can be made of a sheet of plastic steel, teflon, polyvinyl chloride, polycarbonate, or polyurethane, and in this case, the substrate 4 has a printed circuit embedded in a metal or alloy as the base electrode.

This embodiment also preferably employs at least one of the following structural designs.

A notch structure is provided in the substrate corresponding to a position where the chip-style conductive polymer capacitor element is provided.

The notch structure has a depth of 5 to 100 μm.

A dimension at an opening is smaller than a dimension at a bottom of the notch structure.

A length of the anode terminal is 10 to 100 μm.

A total thickness of the substrate is 5 to 1000 μm.

When the electroplating layer is used for connection between the anode base electrodes provided on both sides of one end of the substrate, a longitudinal section of the electroplating layer is preferably L-shaped, with the vertical part and the lateral part of the L-shape respectively located on one end surface of the capacitor and the bottom surface adjacent to the end surface. When the electroplating layer is used for connection between the cathode base electrodes provided on the both sides of the other end of the substrate, a longitudinal section of the electroplating layer on the cathode base electrode is preferably L-shaped, with the vertical part and the lateral part of the L-shape respectively located on the other end surface of the capacitor and the bottom surface adjacent to the end surface. The L-type electroplating layer can improve the solder wicking rate in surface mounting and improve the reliability.

Example 2

Further disclosed is a method for packaging the chip-style conductive polymer capacitor, including a substrate pretreatment, arrayed arrangement of the capacitor elements, packaging of arrayed modules, end surface cutting, electrode treatment, and dissection cutting, where each step is specifically described as follows.

Figure 4:
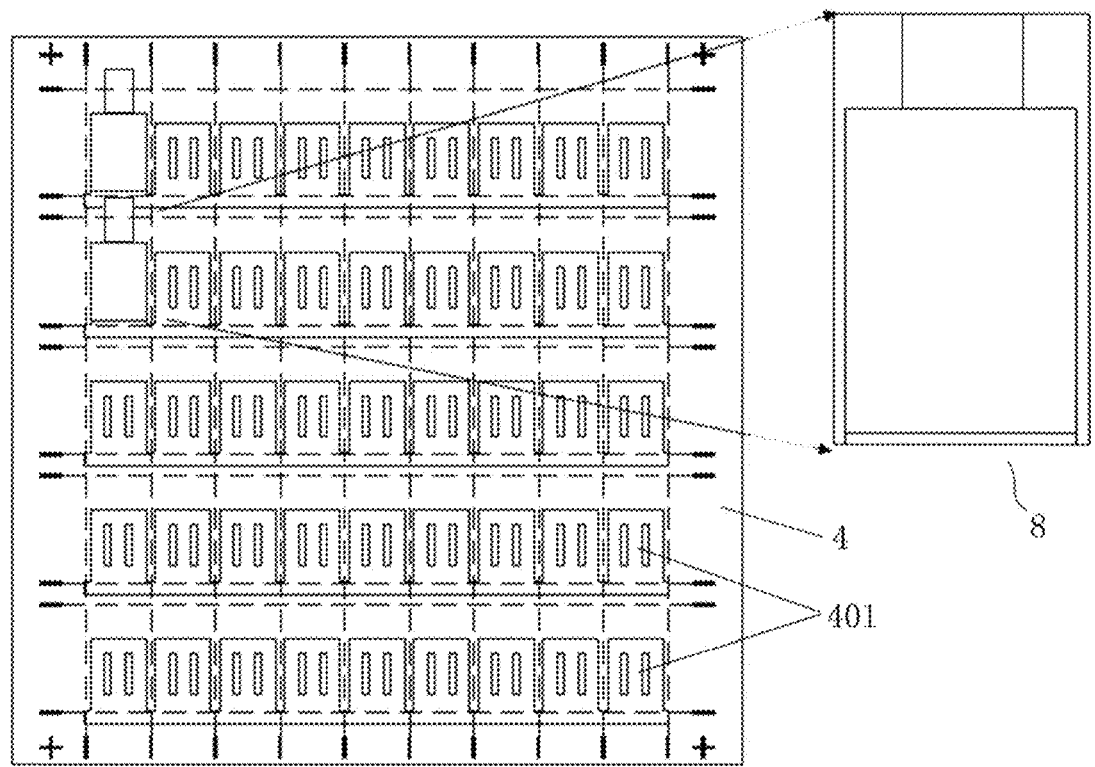
FIG. 4 is a schematic structural diagram showing a front side of a substrate on which partially capacitor elements are provided according to an embodiment.
Figure 6C:
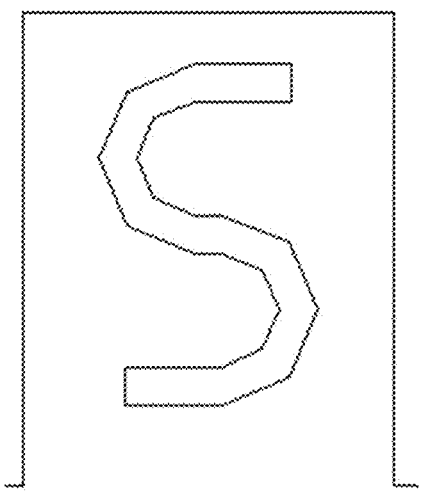
Figure 6D:
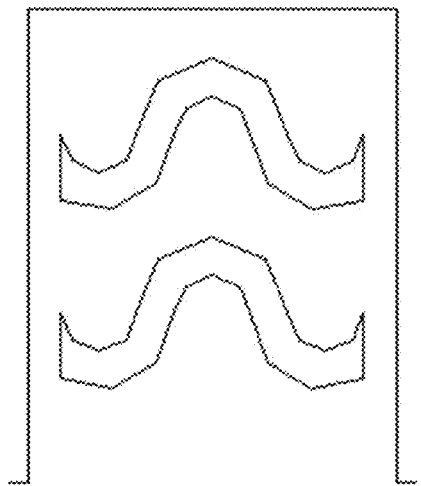

As shown in FIGS. 4 and 5, in the substrate pretreatment, a first cut surface mark and a second cut surface mark are provided on the substrate to facilitate accurate cutting in subsequent steps. Herein, in general, a plurality of the first cut surface mark and the second cut surface mark are provided, and specific positions are determined according to the size of the product to be packaged, and the broken lines in FIGS. 4 and 5 are the cut marks, where the first cut surface marks and the second cut surface marks alternate from top to bottom.

In addition, preferably, a plurality of notch structures 401 for enhancing the bonding are provided in the front side of the substrate 4. As shown in FIGS. 6A, 6B, 6C and 6D, the notch structures 401 are exemplified by (but not limited to) two elongated notches, a plurality of circular notches, an S-shaped notch and two irregularly curved notches. The configurations shown in FIGS. 6A, 6B, 6C, and 6D may be used independently or in combination, or may vary in number depending on the size of the particular product. The notch structure 401 can greatly increase the bonding area of the conductive silver paste, thereby improving the bonding strength.

Further preferably, a size at an opening of the notch structure 401 that enhances bonding is smaller than a size of at a bottom, and/or that the bottom and/or a side wall of the notch structure 401 are roughened.

If the total thickness of the substrate 4 is 10 to 500 μm, a depth of the notch structure 401 is 5 to 100 μm. If the total thickness of the substrate 4 is 50 to 100 μm, the depth of the notch structure 401 is 10 to 80 μm.

Figure 7:
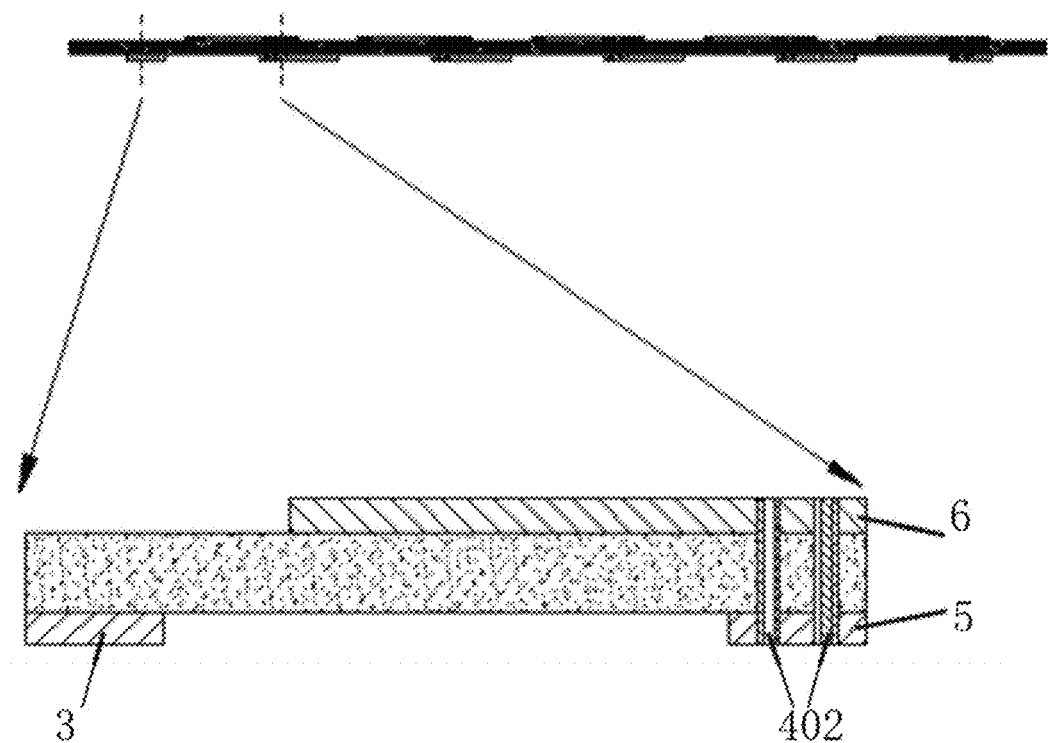
FIG. 7 is a schematic diagram of a partial structure of a non-metal carrier substrate according to an embodiment, showing printed electrode structures on the front and back sides of a cathode.

As shown in FIG. 7, where printed electrode structures on the front and back sides of a non-metal substrate (carrier substrate) are shown, in which the cathode base electrode 25 is connected to the cathode end electrode 5 through the via-hole 402.

Figure 8:
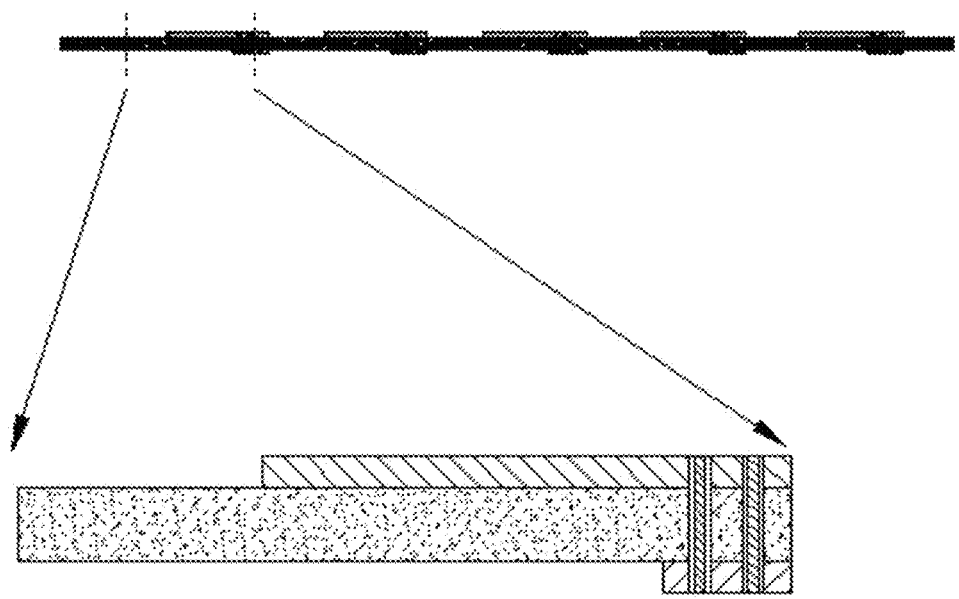
FIG. 8 is a schematic diagram of a partial structure of a non-metal carrier substrate according to another embodiment, showing printed electrode structures on the front and back sides of the cathode.

As shown in FIG. 8, where the printed electrode structures on the front and back sides of the cathode of the non-metal substrate (carrier substrate) are shown, in which the cathode base electrode 25 is connected to the cathode end electrode 5 through the via-hole 402.

Figure 9:
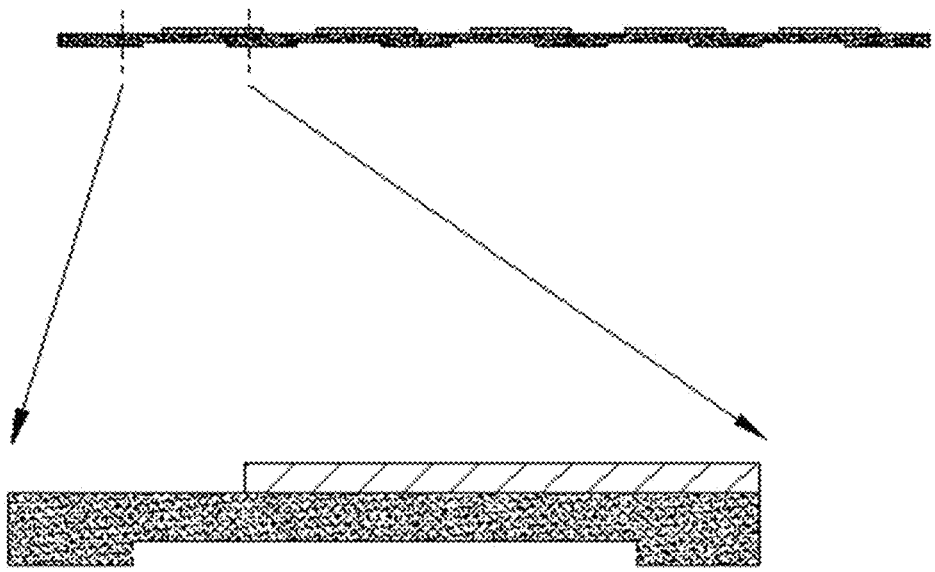
FIG. 9 is a schematic diagram of a partial structure of a non-metal carrier substrate of yet another embodiment, showing printed electrode structures on the front side of the cathode.

As shown in FIG. 9, where the printed electrode structures on the front side of the cathode of the non-metal substrate (carrier substrate) are shown, in which the cathode base electrode 25 and the cathode end electrode 5 are connected through plating.

Figure 10:
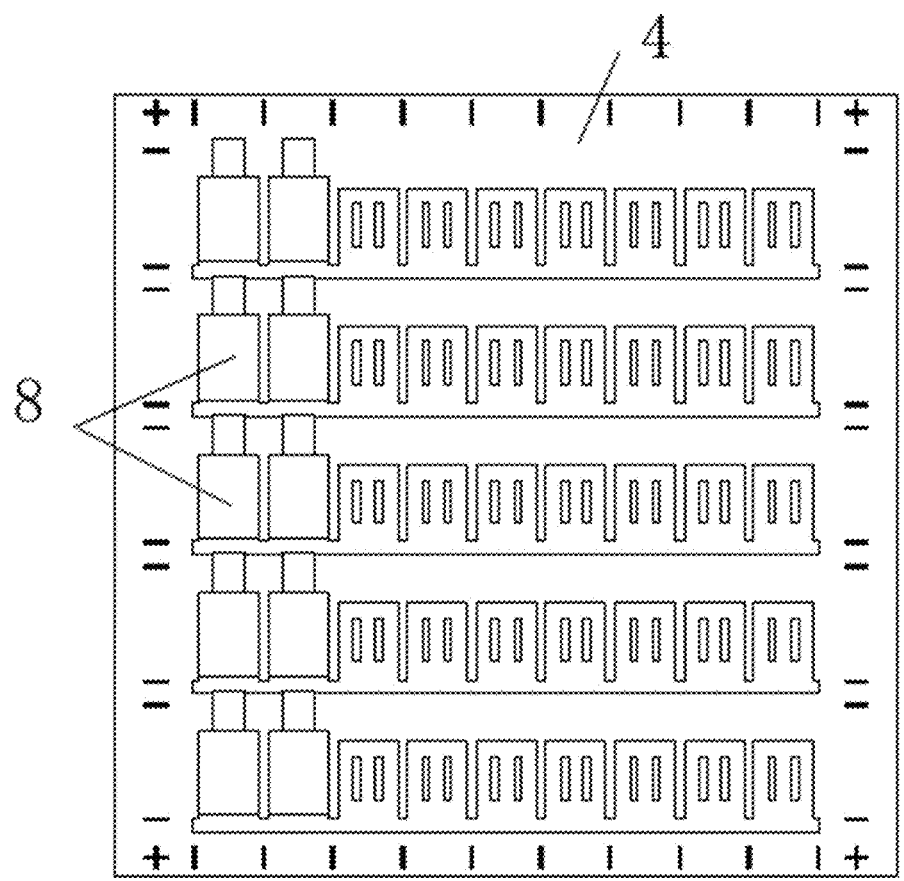
FIG. 10 is a schematic diagram showing some of the capacitor elements arrayed on the substrate.

Arrayed arrangement of the capacitor elements: a plurality of the capacitor elements 8 are arrayed on the substrate 4. FIG. 10 shows a state when some (not all) of the capacitor elements 8 are arranged in an array, it can be seen that a plurality of the capacitor elements 8 are arranged in rows and columns between adjacent first cut surface marks and at the same time between adjacent second cut surface marks, and the capacitor elements 8 in each row are shown to be arranged in the same direction, but the arrangement is not limited thereto, and a face-to-face or back-to-back arrangement can also be used. The capacitor elements 8 include the anode tantalum core 21 and the anode terminal 22 thereof, the anode base electrode 24, the cathode layer 23, and the cathode base electrode 25, wherein the anode tantalum core 21 and the cathode layer 23 are separated by the dielectric layer 26. The anode base electrode 24 includes two parts on the front and back sides, respectively, of one end of the substrate 4, connected through the electroplating layer or the via-hole; the cathode base electrode 25 includes two parts on the front and back sides, respectively, of the other end of the substrate 4, connected through the electroplating layer or the via-hole. The anode terminal 22 is made of a tantalum metal sheet or a tantalum-niobium alloy sheet, and has a flat shape and a rectangular or rounded rectangular cross section.

Figure 11:
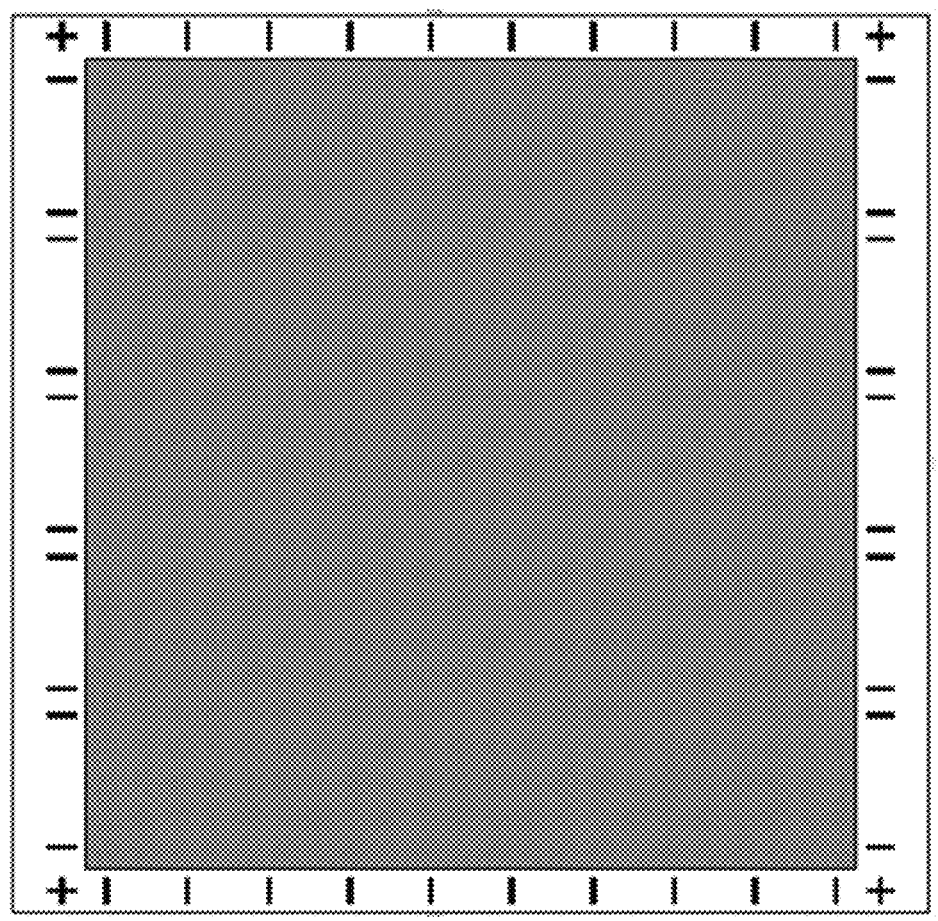
FIG. 11 is a schematic diagram showing capacitor elements arrayed on the substrate and packaged.

Packaging of arrayed modules: packaging in either a vacuum packaging or a spray coating packaging manner. As shown in FIG. 11, the arrayed modules of the chip-style conductive polymer capacitor are packaged by the packaging material layer 1. The packaging material layer 1 may be made of a synthetic resin material and a polymer material. The synthetic resin material may be any of an epoxy resin, a phenolic resin, a silicone rubber, a BCB, a BT resin, etc. The polymer material may be any of polyimide, polytetrafluoro ethylene, polypropylene, etc.

Figure 12:
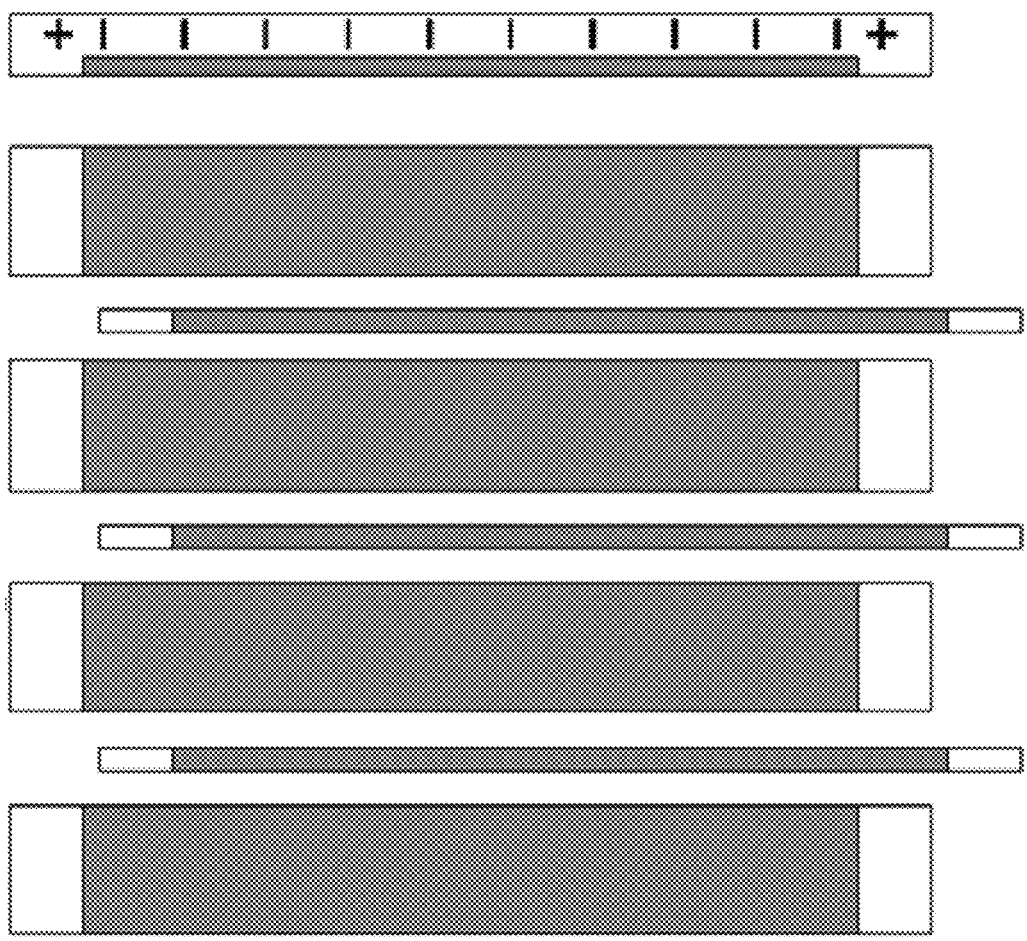
FIG. 12 is a partial schematic view after cutting along a first cut surface mark.

End surface cutting: cutting is performed along the first cut surface mark and the second cut surface mark, respectively, to form an anode cut end surface and a cathode cut end surface, thereby exposing the anode base electrode of the capacitor, such as the anode terminal made of a tantalum metal sheet or a tantalum-niobium alloy sheet, and exposing the cathode base electrode of the capacitor. The method for cutting can be blade cutting, laser cutting, dicing cutting or laser water knife cutting, etc. FIG. 12 is a schematic diagram after cutting along the first cut surface mark, including the waste after cutting and a strip-shaped arrayed modules containing the chip-shaped conductive polymer capacitor.

Electrode treatment: the anode terminal 22 is connected to the anode base electrode 24 on the front side of the substrate 4 through bonding, welding or electroplating and lead out as an anode; the cathode layer 23 is connected to the cathode base electrode 25 on the front side of the substrate 4, the cathode base electrode 25 on the front side of the substrate 4 is connected to the substrate 4 through the conductive silver paste layer 7, and the cathode base electrode 25 on the back side of the substrate 4 is led out as a cathode.

Alternatively, in the step of electrode treatment, plasma cleaning and metal deposition are also performed before bonding, welding or electroplating the anode cut surface, or plasma cleaning and vacuum coating are also performed before bonding, welding or electroplating, or plasma cleaning and vacuum sputter to deposit metal are also performed before bonding, welding or electroplating.

Figure 13:
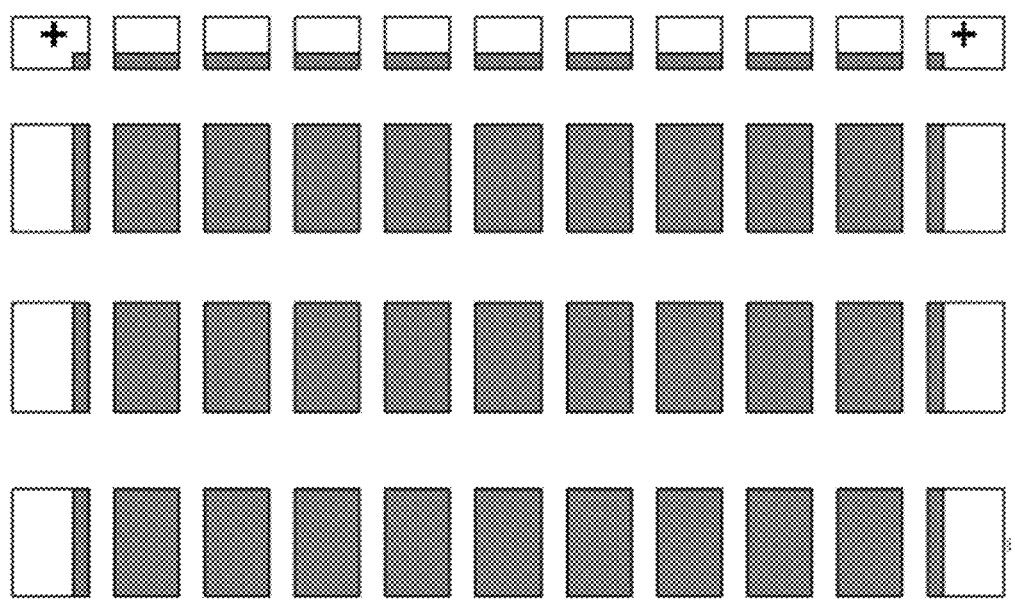
FIG. 13 is a partial schematic view after cutting along a second cut surface mark.

Dissection cutting: the strip-shaped arrayed modules are cut to obtain the chip-style conductive polymer capacitor of individual particles. FIG. 13 is a schematic diagram after dissection cutting, including the cut waste and the finished chip-style conductive polymer capacitor of individual particles. The finished chip-style conductive polymer capacitor of individual particles include the chip-style conductive polymer capacitor element 8, the substrate 4 and the insulating layer thereof, the anode end electrode 3 and the anode base electrode 24 connected thereto, and the cathode end electrode 5 and the cathode base electrode 25 connected thereto. The anode end electrode 3 and the cathode end electrode 5 of the chip-style conductive polymer capacitor are respectively located at both ends of the bottom of the capacitor.

The structure and method for packaging a product herein facilitate the miniaturization and thinning of the chip-style (including ultra-thin chip-style and common chip-style) conductive polymer capacitor, and the electrical performance and reliability of the product can be hereby greatly improved. For example, for a capacitor product or other products as a chip element featuring 16 V/33 μF, a conventional structure and packaging method results in a product size (in mm) of length×width×height=3.5×2.8×1.9, while the present invention can achieve a product size (in mm) of length×width×height=3.5×2.8×1.0, which shows thinning of the product. The invention can also achieve such a size (in mm) of the product as length×width×height=3.2×1.6×1.6, which shows miniaturization of the product.

The above is a detailed description of the present invention in combination with specific preferred embodiments, and cannot be construed to limit the specific implementation of the present invention. Those skilled in the art to which the present invention pertains, without departing from the concept of the present invention, can make equivalent substitutions or modifications that feature the same performance or use, and all these shall fall within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A chip-style conductive polymer capacitor, comprising a chip-style conductive polymer capacitor element, a substrate, and a packaging material layer;
   the chip-style conductive polymer capacitor element is provided on the substrate and includes an anode tantalum core, an anode terminal, an anode base electrode, a dielectric layer, a cathode layer, and a cathode base electrode;
   the anode tantalum core and the cathode layer are separated by the dielectric layer;
   the anode base electrode comprises two parts on the front and back sides, respectively, of one end of the substrate, connected through an electroplating layer and/or a via-hole;
   the cathode base electrode comprises two parts on the front and back sides, respectively, of the other end of the substrate, connected through an electroplating layer and/or a via-hole;
   a cross section of the anode terminal is a rectangle or a rounded rectangle, and the anode terminal is connected to the anode base electrode on a front side of the substrate through bonding, welding or electroplating and led out as an anode;
   the cathode layer is connected to the cathode base electrode on the front side of the substrate, the cathode base electrode on the front side of the substrate is connected to the substrate through a conductive silver paste layer, and the cathode base electrode on the back side of the substrate is led out as a cathode;
   wherein a notch structure is provided in the substrate corresponding to a position where the chip-style conductive polymer capacitor element is provided;
   wherein a dimension at an opening of the notch structure is smaller than a dimension at a bottom of the notch structure.

2. The capacitor according to claim 1, wherein the notch structure has a depth of 5 to 100 μm.

3. The capacitor according to claim 1, wherein a length of the anode terminal is 10 to 100 μm, and a total thickness of the substrate is 5 to 1000 μm.

4. The capacitor according to claim 1, wherein a longitudinal section of the electroplating layer is L-shaped, with a vertical portion and a lateral portion of the L-shape respectively located on one end surface and a bottom surface adjacent to the end surface of the capacitor; a longitudinal section of the cathode end electrode is L-shaped, with a vertical portion and a lateral portion of the L-shape respectively located on the other end surface and a bottom surface adjacent to the end surface of the capacitor.

* * * * *